United States Patent
Meijer et al.

(10) Patent No.: US 8,341,405 B2
(45) Date of Patent: Dec. 25, 2012

(54) ACCESS MANAGEMENT IN AN OFF-PREMISE ENVIRONMENT

(75) Inventors: Henricus Johannes Maria Meijer, Mercer Island, WA (US); William H. Gates, III, Medina, WA (US); Lili Cheng, Bellevue, WA (US); Daniel S. Glasser, Mercer Island, WA (US); Ira L Snyder, Jr., Bellevue, WA (US); Melora Zaner-Godsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1290 days.

(21) Appl. No.: 11/613,369

(22) Filed: Dec. 20, 2006

(65) Prior Publication Data

US 2008/0082538 A1   Apr. 3, 2008

Related U.S. Application Data (63) Continuation-in-part of application No. 11/536,457, filed on Sep. 28, 2006.

(51) Int. Cl.
*G06F 17/30* (2006.01)

(52) U.S. Cl. .......................................... 713/165; 726/27

(58) Field of Classification Search .................... 714/38, 714/49, 48, 35, 37; 709/203, 217, 223, 237, 709/225, 229, 227; 726/22, 14, 13, 11, 34, 726/25, 26, 27; 380/42, 55, 58, 46
See application file for complete search history.

(56) References Cited

U.S. PATENT DOCUMENTS

| | | | |
|---|---|---|---|
| 5,263,165 A | 11/1993 | Janis | |
| 5,537,404 A | 7/1996 | Bentlet et al. | |
| 6,064,656 A | 5/2000 | Angal et al. | |
| 6,195,683 B1 | 2/2001 | Palmer et al. | |
| 6,209,039 B1 | 3/2001 | Albright et al. | |
| 6,226,260 B1 | 5/2001 | McDysan | |
| 6,341,127 B1 | 1/2002 | Katsube et al. | |
| 6,434,532 B2 | 8/2002 | Goldband et al. | |
| 6,469,991 B1 | 10/2002 | Chuah | |

(Continued)

FOREIGN PATENT DOCUMENTS

EP   1376309   1/2004

(Continued)

OTHER PUBLICATIONS

Brunner, et al. "Disruption Tolerant Networking" Dagstuhl Seminar Proceedings (2005) NEC Europe Ltd., Network Labooratories, 4 pages.

(Continued)

*Primary Examiner* — Jeffrey Pwu
*Assistant Examiner* — Nega Woldemariam
(74) *Attorney, Agent, or Firm* — Lee & Hayes, PLLC (57) ABSTRACT

A system that can assist users to manage a personal active directory for all of their information maintained within a cloud-based environment is provided. The identity of a client that accesses data is monitored and recorded in a log. In turn, this information can be made available to the owner of the information in order to develop a desired access control list (ACL). Additionally, the system can employ a heuristic component that can automatically establish the ACL on the owner's behalf. As well, the system can track how information is being accessed (or attempted to be accessed) by other people therefore, giving the owner of the information the opportunity to restrict or allow access based upon any number of recorded factors (e.g., identity, context).

19 Claims, 10 Drawing Sheets

U.S. PATENT DOCUMENTS

| | | | |
|---|---|---|---|
| 6,496,482 | B1 | 12/2002 | Kubota |
| 6,707,820 | B1 | 3/2004 | Arndt et al. |
| 6,745,224 | B1 | 6/2004 | D'Souza et al. |
| 6,917,975 | B2 | 7/2005 | Griffin et al. |
| 6,961,318 | B2 | 11/2005 | Fichou et al. |
| 7,002,926 | B1 | 2/2006 | Eneboe et al. |
| 7,065,041 | B2 | 6/2006 | Sen |
| 7,437,755 | B2 | 10/2008 | Farino et al. |
| 7,516,476 | B1 | 4/2009 | Kraemer et al. |
| 7,903,549 | B2 | 3/2011 | Judge et al. |
| 2002/0124053 | A1 | 9/2002 | Adams et al. |
| 2002/0124067 | A1 | 9/2002 | Parupudi et al. |
| 2003/0105734 | A1 | 6/2003 | Hitchen et al. |
| 2003/0229623 | A1 | 12/2003 | Chang et al. |
| 2003/0233447 | A1 | 12/2003 | Fellenstein et al. |
| 2004/0076160 | A1 | 4/2004 | Phaltankar |
| 2004/0098456 | A1 | 5/2004 | Kryzanowski et al. |
| 2004/0243633 | A1* | 12/2004 | Thompson et al. .......... 707/104.1 |
| 2005/0091539 | A1 | 4/2005 | Wang et al. |
| 2005/0138419 | A1 | 6/2005 | Gupta et al. |
| 2005/0203819 | A1 | 9/2005 | Rogers et al. |
| 2005/0238024 | A1 | 10/2005 | Taylor et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0048224 | A1 | 3/2006 | Duncan et al. |
| 2006/0062161 | A1 | 3/2006 | Tang et al. |
| 2006/0123005 | A1 | 6/2006 | Burnett et al. |
| 2006/0149567 | A1 | 7/2006 | Muller et al. |
| 2007/0143851 | A1* | 6/2007 | Nicodemus et al. ............ 726/25 |
| 2008/0066185 | A1* | 3/2008 | Lester et al. .................... 726/27 |
| 2008/0133716 | A1* | 6/2008 | Rao et al. ...................... 709/220 |

FOREIGN PATENT DOCUMENTS

| | | |
|---|---|---|
| EP | 1524580 | 4/2005 |
| EP | 1564622 | 8/2005 |
| WO | WO2005022826 | 3/2005 |
| WO | 2005022826 | 10/2006 |

OTHER PUBLICATIONS

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29, Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/pdf &identifier=oai:arXiv.org:cs/0502091. Last accessed Sep. 20, 2006.

Office Action for U.S. Appl. No. 11/536,457, mailed on Dec. 15, 2011, Daniel S. Glasser, "Cloud-Based Access Control List", 20 pgs.

Non-Final Office Action for U.S. Appl. No. 11/536,457, mailed on Jul. 11, 2011, Daniel S. Glasser, "Cloud Based Access Control List".

Hughes, et al., "Automated Verification of Access Control Policies". <<http://www.cs.ucsb.edu/~bultan/publications/tech-report04. pdf>> Last accessed Sep. 20, 2006.

System Management Concepts: Operating System and Devices. <<http://www.dlib.indiana.edu/doc_link/en_US/a_doc_lib/aixbman/admnconc/audit.htm>> Last accessed Sep. 20, 2006.

Sandhu, et al., "Access Control: Principles and Practice". IEEE Communications Magazine, Sep. 1994.

Buzzoodle, "Create Buzz Marketing Campaigns". 2004-2005, Buzzoodle, A Liquid Learning Inc. Company. <<http://www.buzzoodle.com>> Last accessed Sep. 20, 2006.

Godin, "Unleashing the Ideavirus". Do You Zoom, Inc., 2000, 197 pages.

* cited by examiner

ACCESS MANAGEMENT IN AN OFF-PREMISE ENVIRONMENT

CROSS REFERENCE TO RELATED APPLICATIONS

This application is a continuation in part of U.S. patent application Ser. No. 11/536,457, filed on Sep. 28, 2006, and entitled CLOUD-BASED ACCESS CONTROL LIST, the entirety of which is incorporated herein by reference.

BACKGROUND

Conventionally, most computational tasks are undertaken upon a client or within a proprietary intranet. For instance, through utilization of a software application resident upon the client, data is created, manipulated, and saved upon a hard drive of the client or on an on-site server. Access to this data is often controlled through the use of access control lists (ACLs).

An ACL can be defined by a set of data associated with a file, directory or other network resource that defines the permissions that users, groups, processes or devices have for accessing it. In one example, an ACL is defined by a table that tells a computer operating system which access rights each user has with respect to a particular system object, such as a file directory or individual file. Each object can have a security attribute that identifies its access control list. The list can include an entry for each system user that has access privileges. The most common privileges include the ability to read a file (or all the files in a directory), to write to the file or files, and to execute the file (if it is an executable file, or program). Of course, the ACL can be implemented differently by each operating system.

Client-side operating systems are employed to manage relationships between users, software applications, and hardware within a client machine, as well as data that is resident upon a connected intranet. The conventional computing paradigm is beginning to shift, however, as maintaining security, indexing data, and the like on each client device can be quite expensive.

As network connectivity has continued to improve, it has become apparent that a more efficient computing model includes lightweight (e.g., inexpensive) clients that continuously communicate with third-party computing devices to achieve substantially similar end results when compared to the conventional computing paradigm. In accordance with this architecture, the third-party can provide a 'cloud' of data, devices and services, such that requests by several clients can simultaneously be serviced within the cloud without the user noticing any degradation in computing performance.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Traditionally, with respect to auditing and controlling access to data, users are often expected to act as extremely sophisticated system administrators that can automatically configure access control lists (ACLs) with respect to all of their information. However, the reality is that most users do not even understand the notions/concepts of a hierarchical tree structure. Data access control and auditing can become even more complex in accordance with the cloud-based environment.

The innovation disclosed and claimed herein, in one aspect thereof, comprises a system that can assist users to monitor and/or control access to all of their information maintained within a cloud (as well as locally). As data becomes more and more distributed from the local control of the user, it is critical that users are aware of the use and access (or attempted access) of their information. In an aspect, the identity of a client that accesses (or attempts to access) data is monitored and recorded in a log. In turn, this information can be made available to the owner of the information in order to develop a desired ACL. In another aspect, the system can employ a heuristic component that can automatically establish the ACL on the owner's behalf. By way of example, the heuristics can consider the sensitivity of the data in view of the identity, role, etc. of the client in order to deem or deny access to the data.

Essentially, the innovation can track how information is being accessed by other people, giving the owner of the information the opportunity to restrict or allow access based upon any number of recorded factors (e.g., identity, context). The ACL can permit an owner of data to set access to information in such a way that a desired outcome can be achieved. In order to make intelligent decisions, the innovation provides a log that allows an owner to view the access patterns associated to information published. In still another aspect, once access has been restricted by an ACL, the innovation can monitor unsuccessful attempts to access the information. This unauthorized access attempt log can also provide meaningful feedback in protecting future access to the data.

In yet another aspect thereof, an artificial intelligence (AI) and/or machine learning and reasoning (MLR) component is provided that employs a probabilistic and/or statistical-based analysis to prognose or infer an action that a user desires to be automatically performed. For example, AI and MLR mechanisms can be employed to automatically establish an ACL based upon statistical and/or historical data.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The following terms are used throughout the description, the definitions of which are provided herein to assist in understanding various aspects of the subject innovation. It is to be understood that this definition is not intended to limit the scope of the disclosure and claims appended hereto in any way. As used herein, a 'cloud' can refer to a collection of resources (e.g., hardware and/or software) provided and maintained by an off-site party (e.g., third party), wherein the collection of resources can be accessed by an identified user over a network. The resources can include data storage services, word processing services, and many other information technological services that are conventionally associated with personal computers or local servers.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
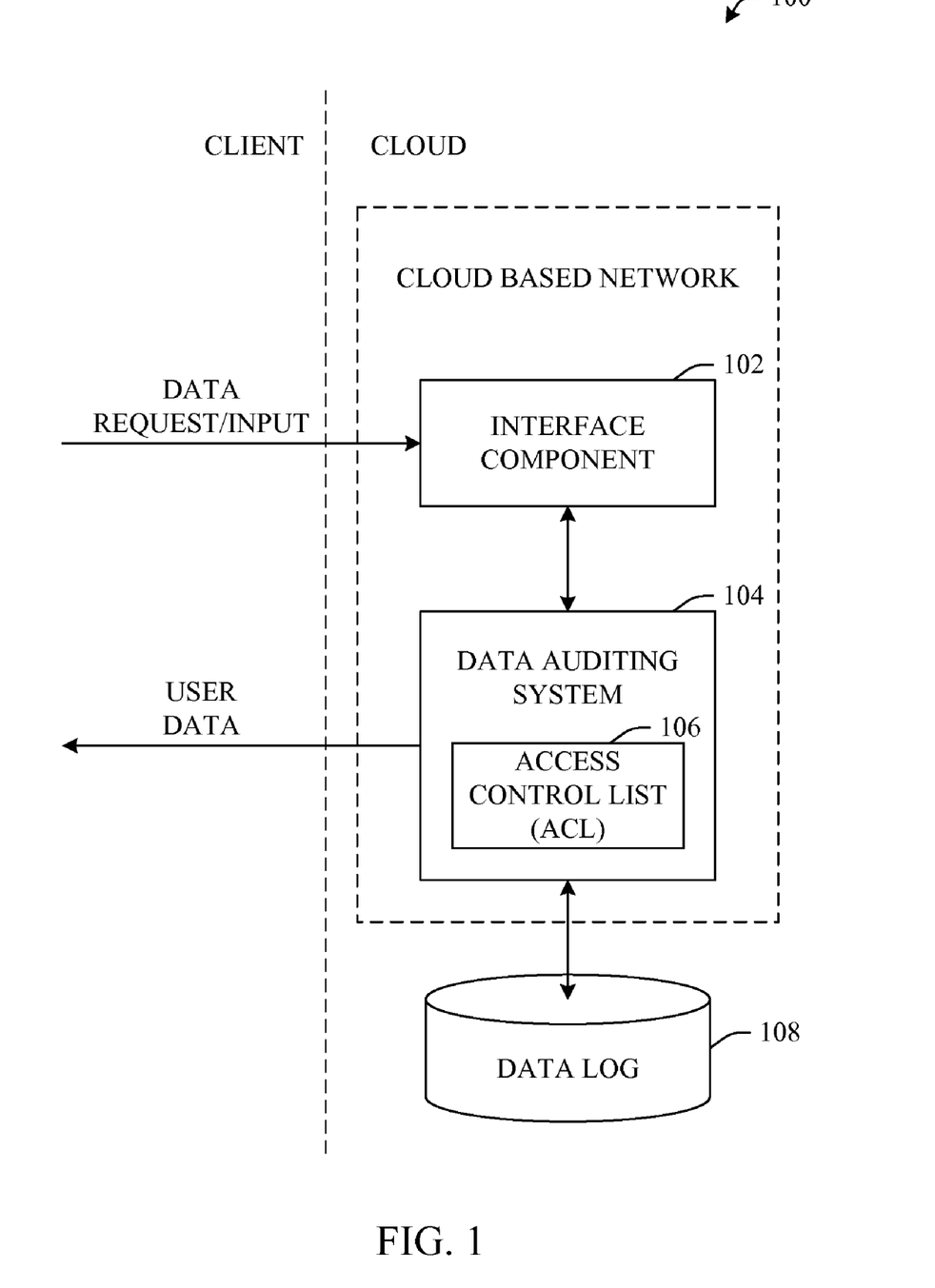
FIG. 1 illustrates a 'cloud-based' resource management system that employs an access control list (ACL) to manage resource access in accordance with an aspect of the innovation.

Referring initially to the drawings, FIG. 1 illustrates a 'cloud-based' system 100 that facilitates automatic data management in accordance with an aspect of the innovation. As used herein and defined above, a 'cloud' refers to a collection of resources (e.g., hardware, data and/or software) provided and maintained by an off-site or off-premise party (e.g., third party), wherein the collection of data and resources can be accessed by an identified user via a network. The resources can include data storage services, data processing services (e.g., applications), and many other services that are conventionally associated with and resident within personal computers or local or 'on-premise' servers.

Conventionally, with respect to auditing and controlling access to data and other controlled resources, users are often expected to be extremely intelligent system administrators who can automatically configure access control lists (ACLs) with respect to all of their information, data and other resources. However, the reality is most often that most users do not even understand the notion of a hierarchical tree structure.

In the described embodiments, the subject specification discloses a system that can assist users to automatically and/or dynamically manage access to all of their information (on-premise as well as off-premise). More particularly, as data becomes more and more distributed from the local control of the user, it is critical that users are aware of the use and access (or attempted access) of their information. This is especially important in the 'off-premise' model of the 'cloud-based' system disclosed herein.

Referring again to FIG. 1, generally, the system 100 can include an interface component 102 and a data auditing system 104 that facilitate data management. In one aspect, as illustrated, a data request can be received from a client (e.g., user, device) and processed by the interface component 102. It will be understood that the interface component 102 is effectively a 'gateway' from a user into the 'cloud'. The vertical dashed line in FIG. 1 is shown to delineate an 'on-premise' location to an 'off-premise' location. In other words, in accordance with the 'cloud-based' system of the subject innovation, the client can be a thin client whereby processing and data/resource management all takes place 'off-premise' from the client. The interface component 102 is illustrative of a gateway that affords the thin client the ability to access data and other resources within the 'cloud-based' system.

The data auditing system 104 can be employed to manage access to data. In aspects, the data auditing system 104 can automatically establish an access control list (ACL) 106 which can secure data access and essentially dictate which requestors are authorized to utilize the data and/or other resources. The data auditing system 104 can analyze the data, for example the content, type, etc., and thereafter automatically apply appropriate safeguards. These safeguards (e.g., ACL 106) can be based upon a preprogrammed rule or policy. As well, machine learning and reasoning mechanisms and protocols can be employed to determine an appropriate ACL 106.

In other aspects, the data auditing system 104 can be employed to monitor or track use and/or attempted use of 'off-premise' data. In doing so, the data auditing system 104 can create, maintain and/or update a data log 108 with respect to data. This data log can be viewed by an owner of data. As well, the data auditing system 104 can automatically notify an owner of data of unauthorized attempts to access data (e.g., protected data). Thus, upon receiving the notification, the owner can access the data log 108 to learn more about the use and/or attempted use of data.

In other aspects, the identity of a client (or user) that accesses data can be established, monitored and recorded in the data log 108. In turn, this information can be made available to the owner of the information in order to develop a desired ACL 106. In another aspect, the system can employ a heuristic component that can automatically establish the ACL 106 on the owner's behalf.

By way of example, the heuristics can consider the sensitivity, content and/or context of the data in view of the identity, role, etc. of the client in order to deem or deny access to the data. Additionally, heuristics can be employed in a semi-automatic mode where the user can interact with the heuristics component and/or review the ACL. In this mode, a user can affirmatively mark data and/or select approved/unapproved identities with respect to the ACL. Thus, the heuristics can be employed to block appropriate users, tighten or loosen security of specified data, etc. Moreover, the heuristics can be employed to create and/or modify ACL characteristics based upon related data and/or identities to those specified.

Essentially, the innovation, via the data auditing system 104, can track when information is accessed by other people thus, giving the owner of the information the opportunity to restrict or allow access based upon any number of recorded factors (e.g., identity, context). The ACL 106 can permit an owner of data to set access limits to information in such a way that a desired outcome can be achieved. In order to make intelligent decisions, the innovation provides the data log 108 that allows an owner to view the access patterns associated with published information. As stated above, once access has been restricted by an ACL 106, the innovation can monitor unsuccessful attempts to access the information. It will be understood that the data log 108 can provide meaningful feedback that can be used to make informed decisions about protecting future access to the data.

Figure 2:
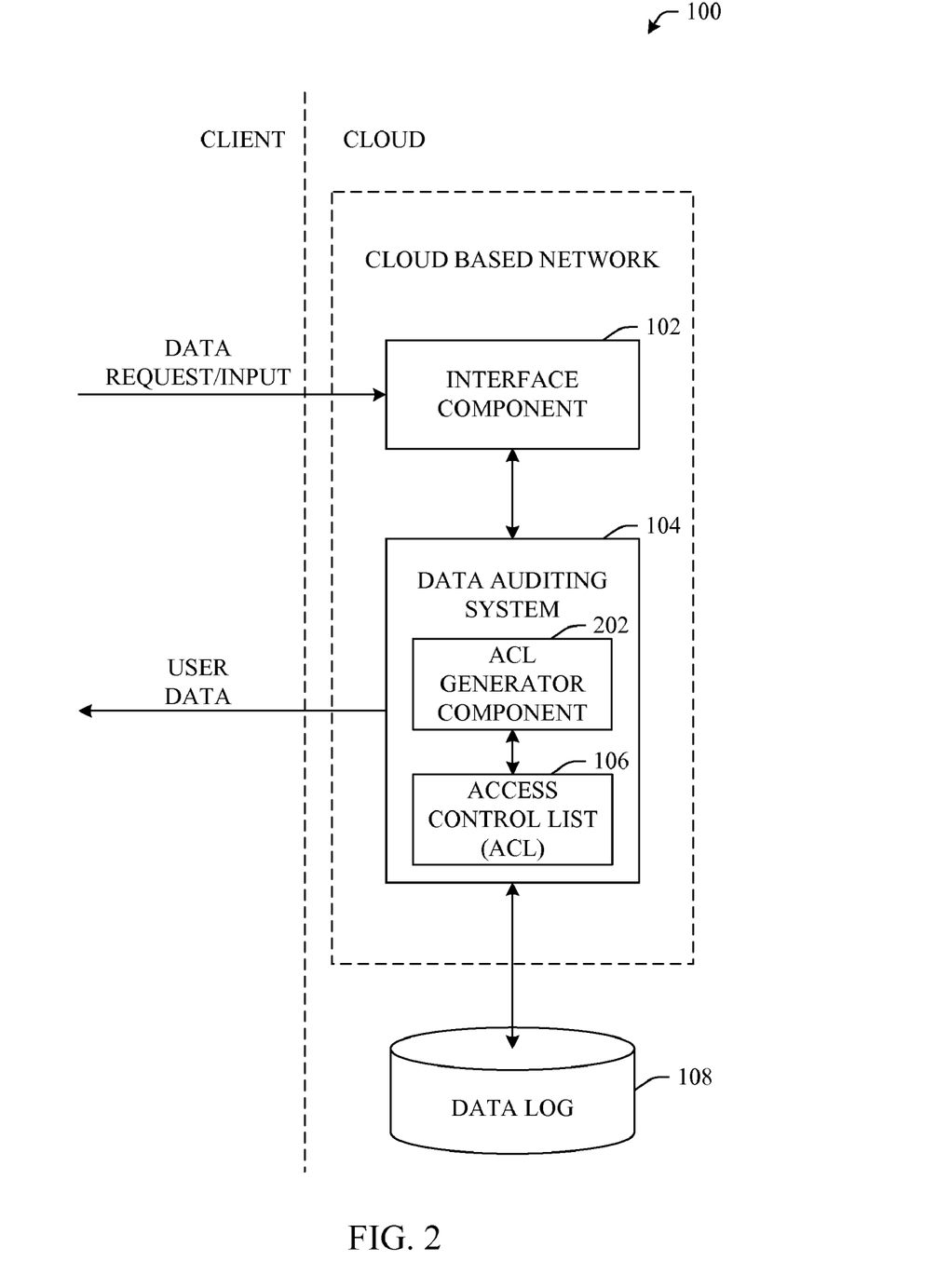
FIG. 2 illustrates a cloud-based system the employs an ACL generator component to establish an ACL in accordance with an aspect of the innovation.

Referring now to FIG. 2, an alternative block diagram of system 100 is shown. More particularly, with respect to the alternative block diagram, the data auditing system 104 is shown to include an ACL generator component 202 which can assist a user to establish an ACL 106. As briefly described supra, this ACL generator component 202 can automatically generate an ACL 106 based upon a number of factors, including but not limited to, owner role, owner organization, data content/type analysis, programmed policy, MLR mechanisms or the like. Essentially, the ACL generator component 202 can be employed to automatically create and dynamically maintain ACL component 106 based upon the data item itself as well as factors that surround or are related to the data item.

In aspects, the ACL generator component 202 can analyze the content of a document, the type of document, contextual factors related to a document, metadata associated with a document (e.g., security clearance/classification), etc. Thereafter, the ACL generator component 202 can establish the ACL 106 which controls access to data. The ACL can be a table that informs a computer operating system which access rights each user should be granted with respect to a particular system object, such as a file directory or individual file. It will be appreciated that each object can have a security attribute that identifies its ACL. Effectively, the list can have an entry for each system user with access privileges. Some of the most common privileges include the ability to read a single file, to read all the files in a specific directory, to write to the file or files, and to execute the file, if it is an executable file, or program.

By way of example, suppose an employer generates an executable data file intended to be accessed only by the members of the employer's organization. In operation, the data auditing system 104 can employ the ACL generator component 202 to analyze the file and determine type, content, purpose, etc. of the file. In accordance with the gathered information related to the file, the ACL generator component 202 can automatically associate the file to an appropriate ACL 106. In doing so, appropriate security attributes can be applied to associate the file to desired rights. In this example, it might be appropriate to limit right to the file to users within the organization. Similarly, limits can be put into place via the ACL 106 with respect to user roles within the organization. In essence, most any parameters and/or criteria can be used to limit and/or control access to data via the ACL 106.

Figure 3:
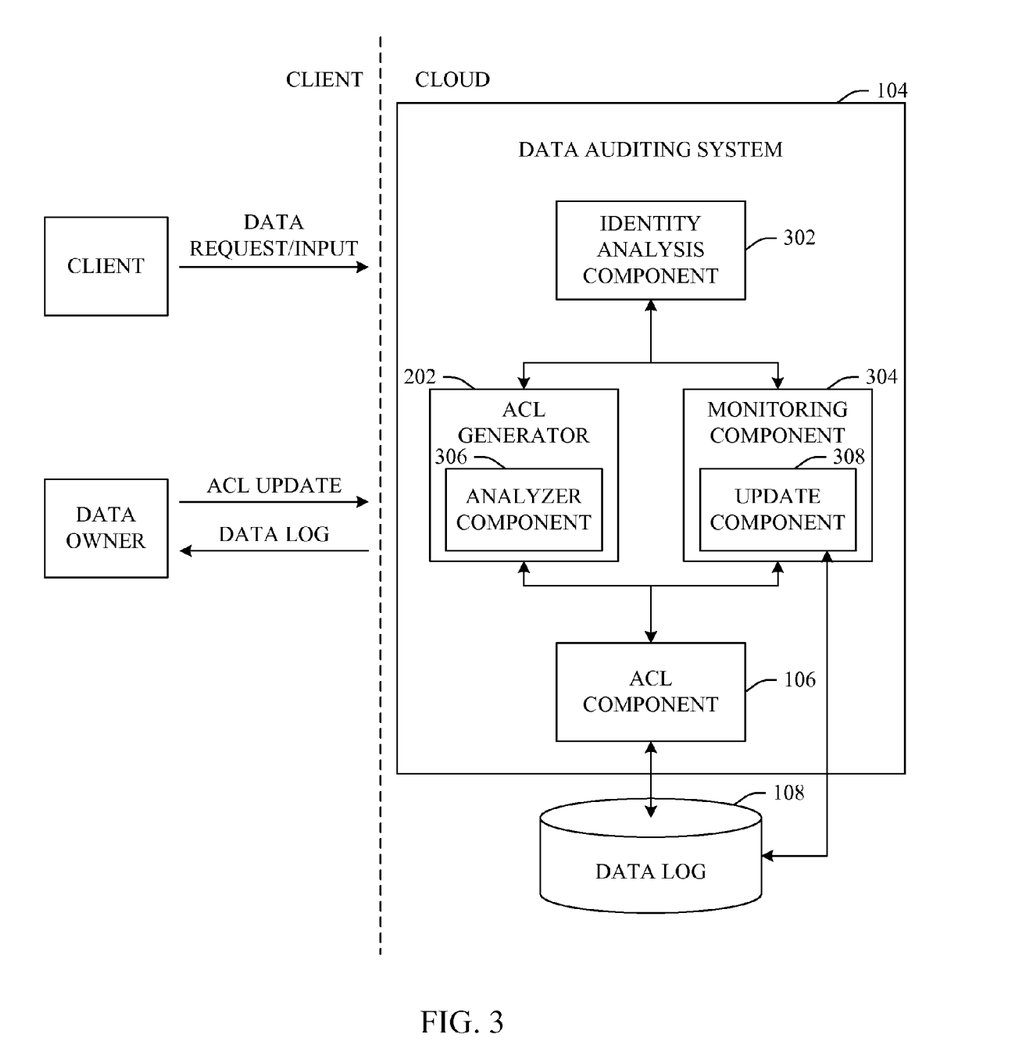
FIG. 3 illustrates a system that employs an identity analysis component that facilitates enforcing the ACL in accordance with an aspect of the innovation.

With reference now to FIG. 3, an alternative block diagram of data auditing system 104 in accordance with an embodiment is shown. Generally, the data auditing system 104 of FIG. 3 can include an identity analysis component 302, an ACL generator component 202 and a monitoring component 304 which can limit access based upon the identity of a user. The ACL generator component 202 and the monitoring component 304 can facilitate generation and maintenance of the ACL component 106. It is to be understood that, in accordance with aspects of the innovation, the ACL component 106 can be associated with a single file as well as a group of files as desired and/or appropriate.

The identity analysis component 302 can determine the identity of a data originator and/or a requestor. Each of these two scenarios will be described in more detail below. Turning first to a discussion of a data originator, the identity analysis component 302 can establish an identity of the originator by examining criterion including, but not limited to logon criteria (e.g., name/password), biometrics, user context, device profile, etc.

It is to be understood that a single user can have multiple identities associated therewith. For instance, a user can have a 'home' identity, a 'work' identity, a 'gaming' identity or the like. These identities can be distinguished by considering contextual factors related to a user and/or session. For instance, if a user is at home in the evening and engaged in an activity that is not work-related, the identity analysis component 302 can infer that the 'work' identity should not apply to a particular data item created. In this scenario, the more data points considered can increase the confidence level and probabilities that a 'home' identity should be applied.

Similarly, ACL generator component 202 can employ an analyzer component 306 that further evaluates criteria related to the data file creation. For instance, the analyzer component 306 can analyze, for example, the content of the data in order to determine the focus or subject matter of such document. This focus and/or subject matter of the data can be considered alone or together with the identity of the originator in order to determine or generate an appropriate ACL component.

As will be described in greater detail infra, machine learning and reasoning mechanisms can be employed to infer or determine an intention or desire of the owner (e.g., originator) of the data with respect to controlling access. As well, rules or preprogrammed policies can be used to assist in the establishment of an ACL component 106. In examples, a user can preprogram rules or machine learning (e.g., Bayesian) can infer rules and/or policies based upon data characteristics and context.

As the aforementioned scenario describes automatic generation of the ACL component 106, the following discussion relates to management and restriction of access to data as a function of the ACL component 106. In this scenario, the identity analysis component 302 can be used to establish an appropriate identity of a requestor. As described above, it is to be understood that multiple identities can be associated with a single user. As such, the ACL component 106 can be employed to restrict and/or allow access to data based upon a particular identity.

The monitoring component 304 can track access requests with respect to data. More specifically, the monitoring component 304 can be used to observe access requests whether granted or denied. For instance, if a particular user requests access to a data object, the monitoring component can employ an update component 308 to record whether or not the request is granted or denied based upon the ACL component 106. As shown, the update component 308 can maintain the information in a data log 108.

Effectively, the data log 108 can be referred to as an access record with respect to all (or a subset of) data associated with a particular owner. As illustrated, the data owner can view the data log 108 from outside of the cloud thereafter using the information in the data log 108 to modify the ACL component 106 as desired.

Specifically, the data log can include a record of accesses granted as well as access attempts that were denied. The update component 308 can be employed to modify the data log 108 with respect to data access status. Accordingly, as described supra, the data log 108 can be used as an information source with respect to an owner's data. Moreover, this data log 108 can be used by the ACL generator 202 to create and/or modify the ACL component 106 thereby modifying safeguards with respect to data.

Figure 4:
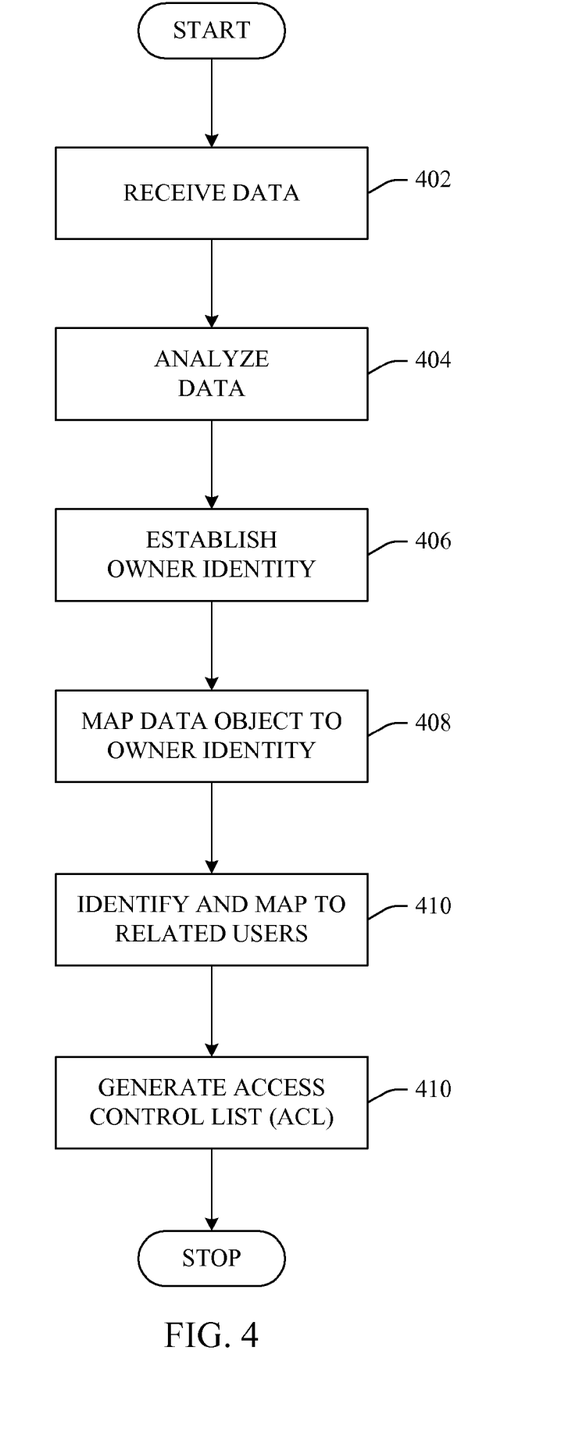
FIG. 4 illustrates an exemplary flow chart of procedures that facilitate establishing an ACL in accordance with an aspect of the innovation.

FIG. 4 illustrates a methodology of establishing an ACL in accordance with an aspect of the specification. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 402, data can be received, for example, from a user action (e.g., save operation), automated application feed or other automated feed such as an RSS feed. Once the data is received, the data can be analyzed. For example, the content of the data can be analyzed in order to determine the subject of the data, proprietary nature of the content, organizational relation, etc.

The owner's identity (or identities) can be established at 406. As described above, an owner can have multiple identities, thus, it is not imperative that the data applies to all of the owner's individual identities. For instance, if the data is found to be related to an owner's employment, the identity can be determined to be the owner's 'work' identity rather than the owner's 'home', 'personal' or other identity.

The data object can be mapped to the appropriate identity at 408. It is to be understood that the data can be mapped to more than one identity. In other words, the data can be mapped to multiple identities of a single owner as appropriate. As well, the data can be mapped to multiple identities of multiple owners (e.g., documents having multiple owners/authors).

Similarly, at 410, the data can be mapped to related users at 410. As described with respect to the owner identities, related users can be identified at 410. Thus, the data can be mapped to the identity(ies) of the related users. By way of example, if at 404 it is determined that the data is associated to an organization, related organization users can be identified. Thereafter, the data can be mapped to all of the related users. Accordingly, at 410, the ACL can be generated thus, monitoring and restricting access to data as appropriate. As discussed supra, the ACL can be automatically generated as well as manually or dynamically modified as appropriate.

Figure 5:
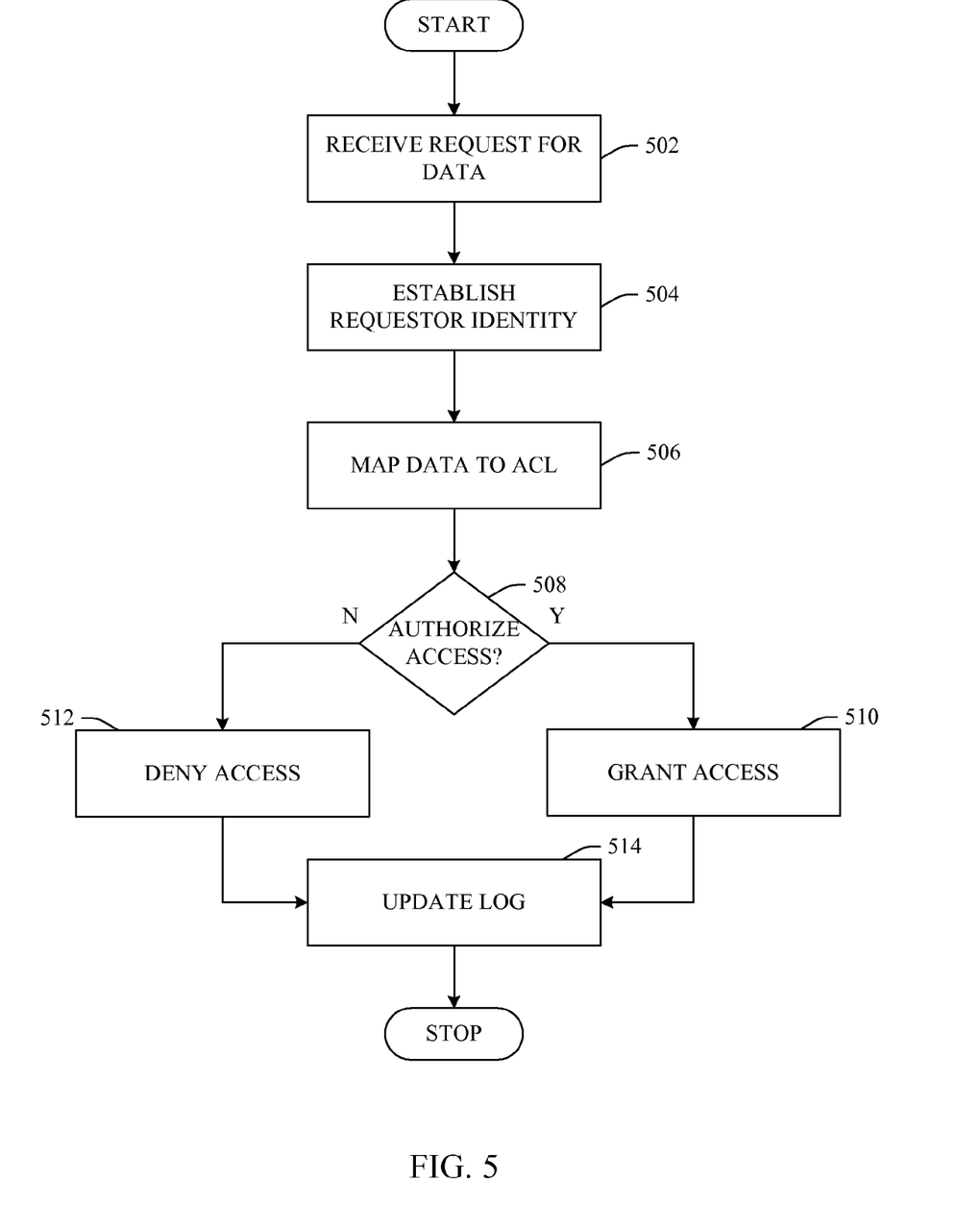
FIG. 5 illustrates an exemplary flow chart of procedures that facilitate rendering data in accordance with an aspect of the innovation.

Turning now to FIG. 5, a methodology of applying an ACL in accordance with an aspect of the specification is shown. Specifically, at 502, a request for data is received. The identity of the requester can be established at 504. As described above, it is to be understood that a single user can have multiple identities (e.g., 'home', 'work', 'personal') which can be determined based upon criteria related to the user.

By way of example, in the act of establishing the requester identity, contextual factors related to the requester can be gathered and analyzed. Moreover, device profile(s) can be evaluated in order to increase the accuracy of determining the identity. For example, assuming a user has an employer issued mobile phone and a personal mobile phone, analysis of the device profile can assist in a determination with respect to a current identity of a user. Similarly, contextual factors such as, time of day, location, direction traveling, current activity, or the like can increase the ability and accuracy of establishing a correct identity.

With reference again to FIG. 5, at 506, the data is associated to the appropriate ACL. A determination can be made at 508 if authorization should be granted to access the data. For example, the authorization can be based upon the ACL considering the appropriate requestor identity.

If at 508, authorization is permitted, access can be granted at 510. On the other hand, if authorization is not permitted, access is denied at 512. In either case, at 514, the log can be updated to reflect activity with respect to the data object. Updating the log allows the owner of data to view activity with respect to data. It is to be appreciated that the ability to view the access log can provide information to an owner which can later be used to modify an ACL, increase data protection, track use (e.g., monetization, survey), etc.

Figure 6:
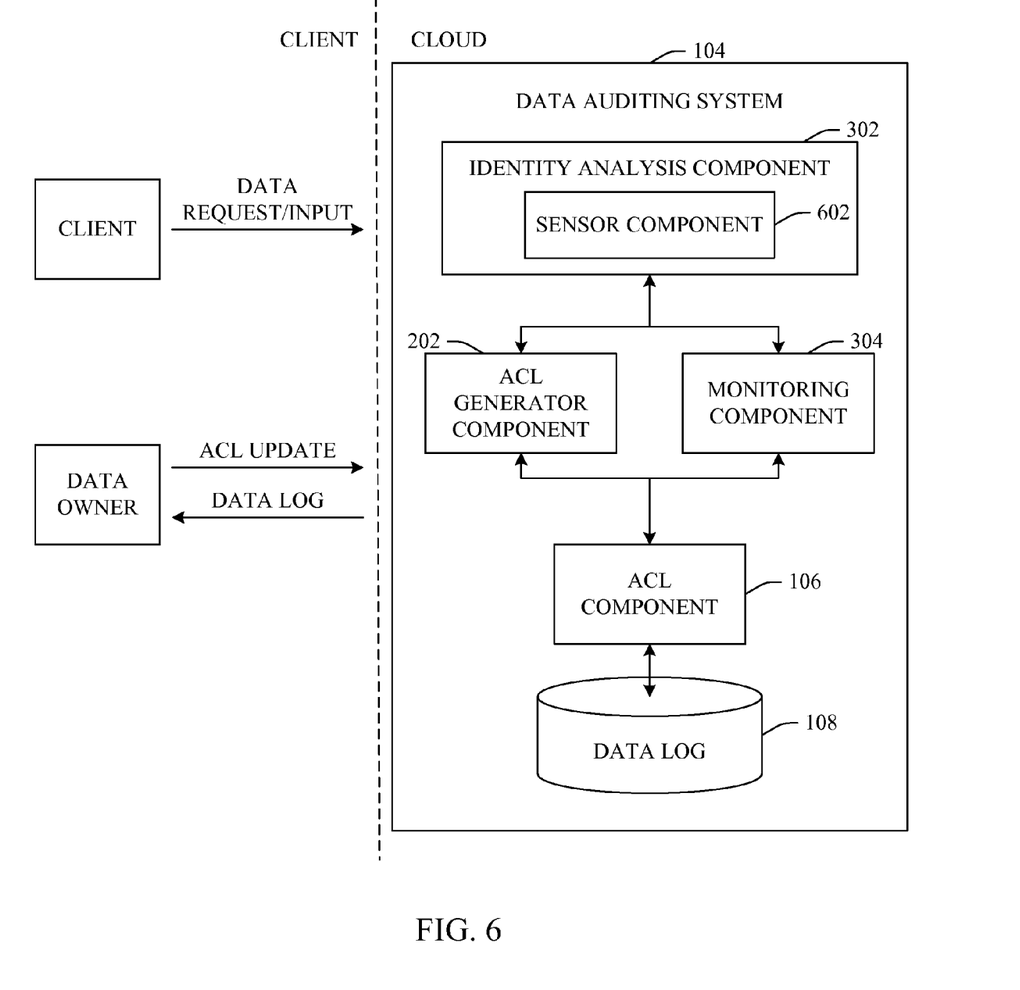
FIG. 6 illustrates a system that employs an identity analysis component that facilitates identifying a user in accordance with an aspect of the innovation.

Referring now to FIG. 6, an alternative block diagram of data auditing system 104 is shown. In particular, the identity analysis component 302 can include a sensor component 602 which can be employed to gather information related to the environment as well as to a user (e.g., owner or requestor).

Figure 7:
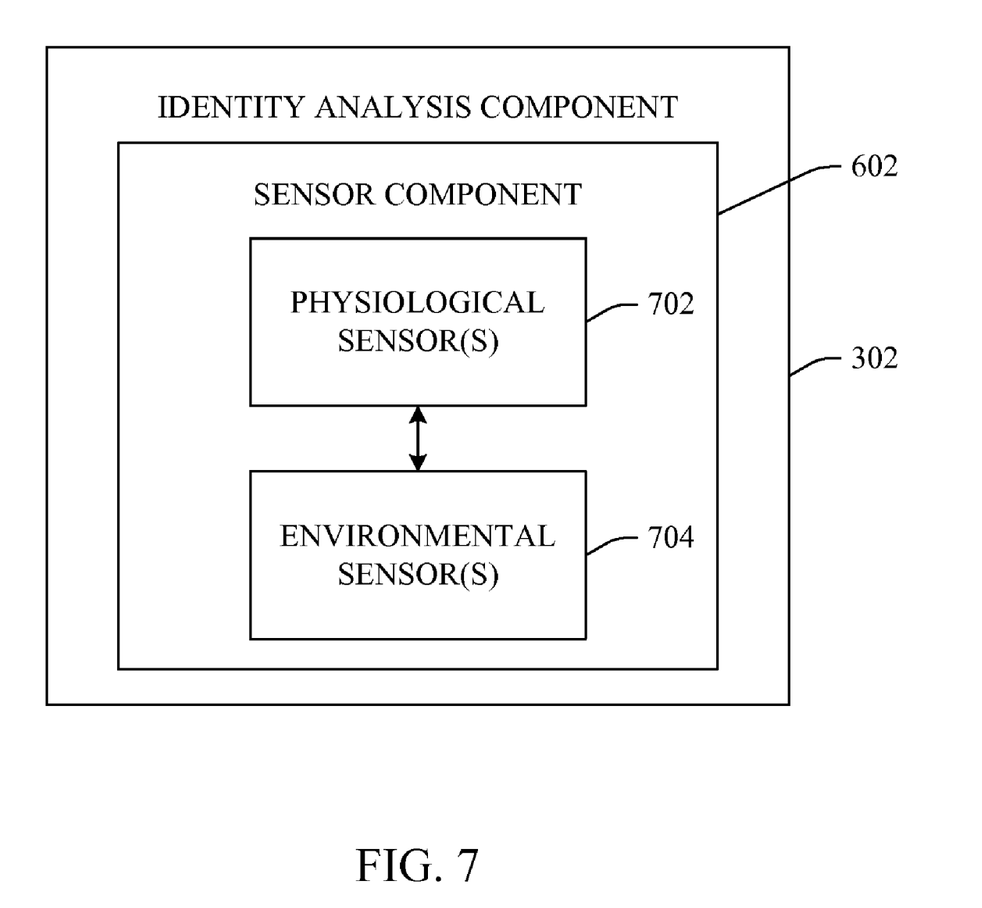
FIG. 7 illustrates an exemplary block diagram of an identity analysis component that employs physiological and/or environmental sensor to establish an identity of a user.

FIG. 7 illustrates an exemplary identity analysis component 302 in accordance with an aspect of the innovation. As shown, sensor component 602 can employ a physiological sensor component 702 and/or an environmental sensor component 704. In operation, these sensor components (702, 704) can be employed to establish an identity of a data owner and/or requester as appropriate.

By way of example, sensor components 702, 704 can be employed to gather biometric information, user role, user organization affiliation(s), user and environmental context (e.g., time of day, location, current activity, direction of travel), device context (e.g., type, available memory, screen size, owner), etc. This information can be employed to assist in automatically determining an identity of a data owner and/or requestor. As described above, this identity information can be used grant or deny access with respect to an applicable ACL.

Figure 8:
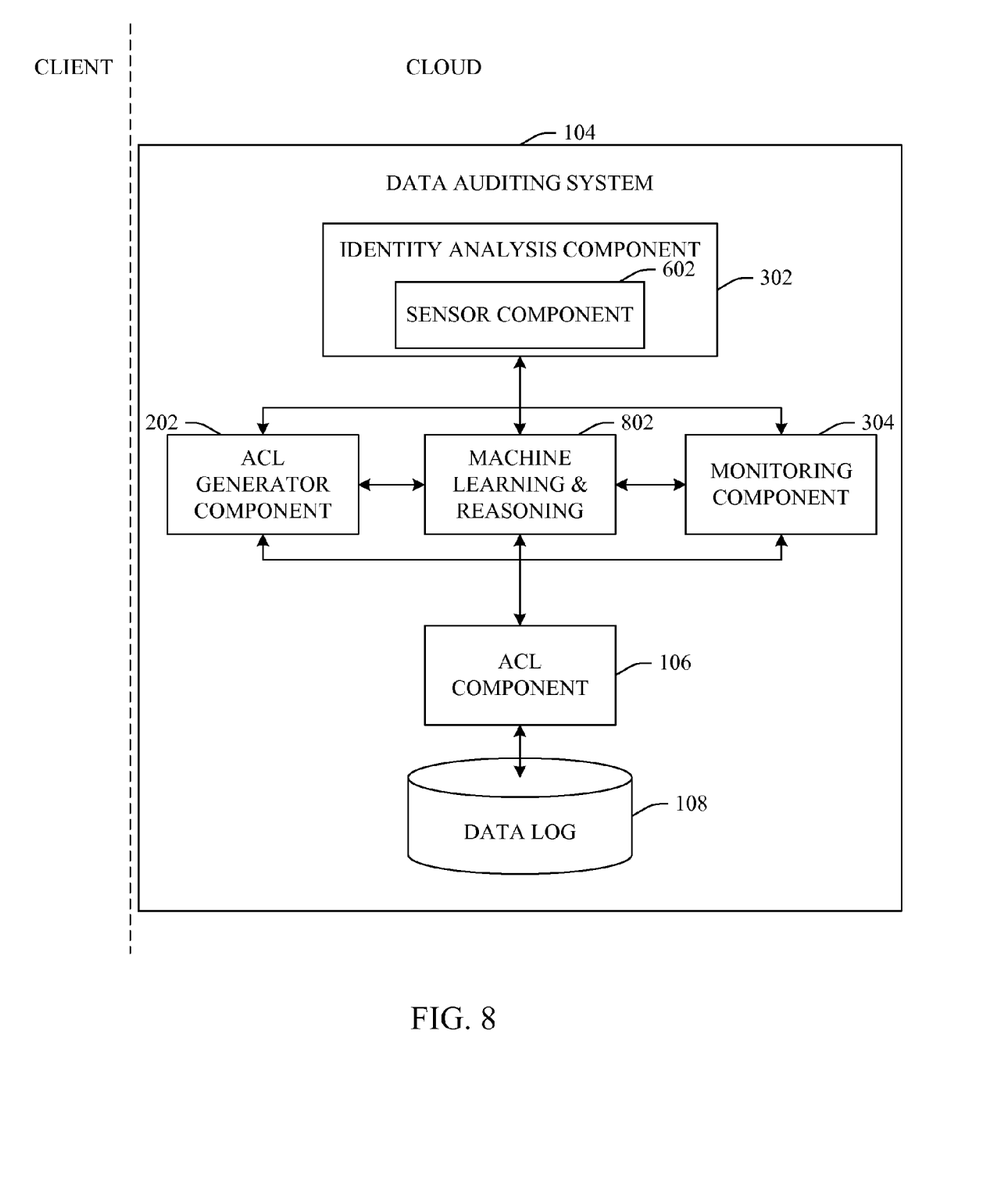
FIG. 8 illustrates a system that employs machine learning & reasoning (MLR) mechanisms that can automate one or more actions on behalf of a user.

With reference now to FIG. 8, a block diagram of an alternative data auditing system 104 in accordance with an aspect of the innovation is shown. As illustrated, the data auditing system 104 can include a machine learning and reasoning (MLR) component 802 that can interface with the identity analysis component 302, the ACL generator component 202 and/or the monitoring component 304 to automatic and/or infer actions of one or more features in accordance with the subject innovation.

The subject innovation (e.g., in connection with identifying an individual) can employ various MLR-based schemes for carrying out various aspects thereof. For example, a process for determining the identity of a user, an appropriate ACL to generate, how/when to update a data log, etc. can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria what is the identity of a user, which resource to render in view of contextual factors, etc.

Figure 9:
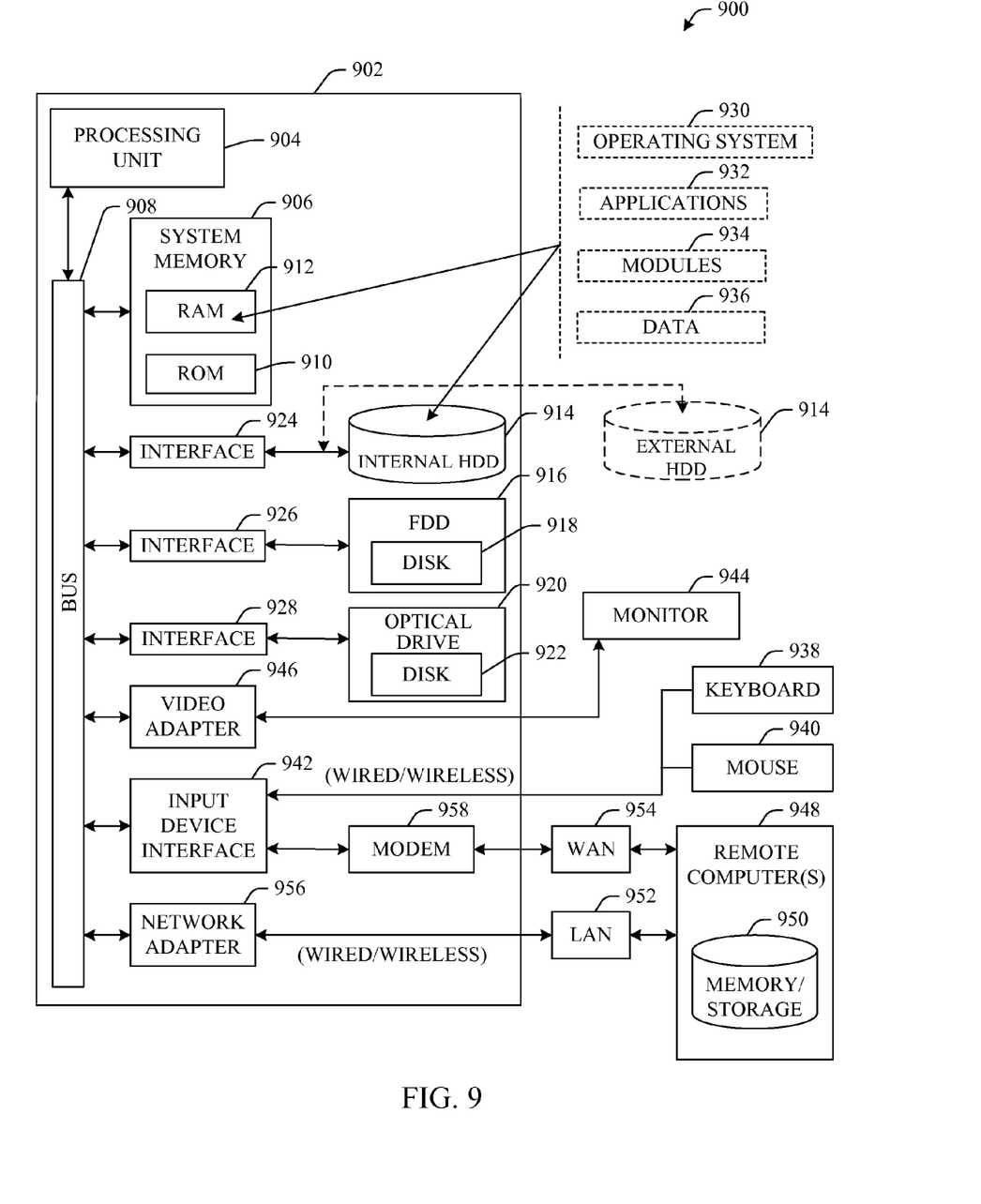
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 930 is illustrated. The logical connections depicted include wired/wireless connectivity to a local area network (LAN) 932 and/or larger networks, e.g., a wide area network (WAN) 934. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 932 through a wired and/or wireless communication network interface or adapter 936. The adapter 936 may facilitate wired or wireless communication to the LAN 932, which may also include a wireless access point disposed thereon for communicating with the wireless adapter 936.

When used in a WAN networking environment, the computer 902 can include a modem 938, or is connected to a communications server on the WAN 934, or has other means for establishing communications over the WAN 934, such as by way of the Internet. The modem 938, which can be internal or external and a wired or wireless device, is connected to the system bus 908 via the serial port interface 942. In a networked environment, program modules depicted relative to the computer 902, or portions thereof, can be stored in the remote memory/storage device 1230. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
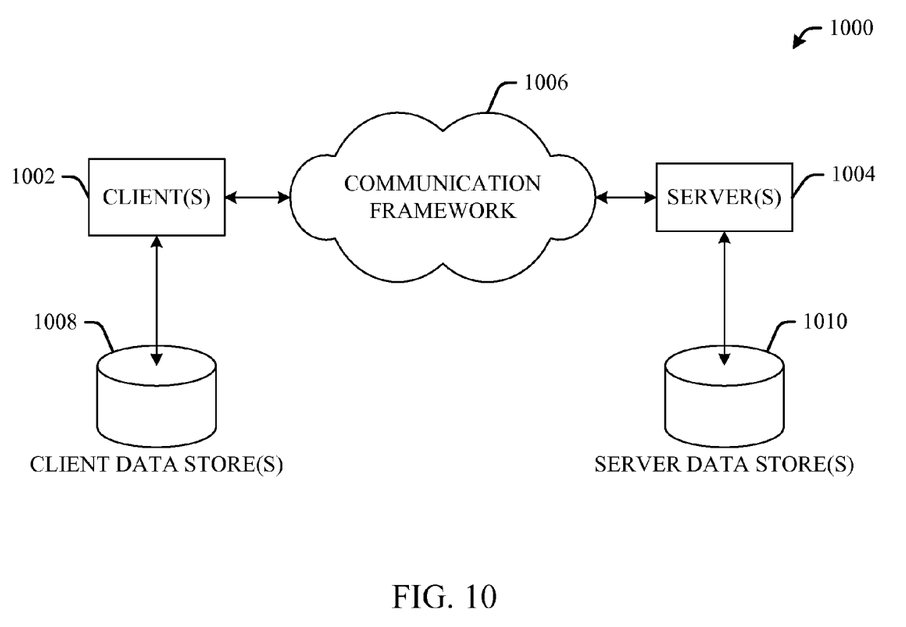
FIG. 10 illustrates a schematic block diagram of an exemplary computing environment in accordance with the subject innovation.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data management, the system comprising:
    an interface component that receives a data request for data from a user;
    a data auditing component that:
        performs analysis of the data to determine at least one of a content, a type or a context of the data;
        establishes an identity of the user;
        automatically creates an access control list (ACL) based on at least one of the content, the type or the context of the data and the identity of the user;
        selectively renders data in response to the data request as a function of the ACL;
        establishes one or more identities of an owner of the data; and
        maps the data to the one or more identities;
    a sensor component to facilitate establishment of the identity of the user, wherein the sensor component is configured to gather information comprising:
        a role of the user;
        a location of the user; and
        an organizational affiliation of the user; and
    a machine learning and reasoning component to automatically establish a policy related to the data, the policy is employed to establish the ACL, the machine learning and reasoning component is trained using a data log, the data log includes user identities and information relating to access patterns pertaining to user access of data.

2. The system of claim 1, the data auditing component dynamically updates the ACL based upon a preference of the owner of the data.

3. The system of claim 1, the data auditing component dynamically updates the ACL based upon a criterion of the data.

4. The system of claim 3, the criterion is one of a data type, content, context, owner, privacy policy and security classification.

5. The system of claim 1, the ACL is distributed between an on-premise and an off-premise environment.

6. The system of claim 1, the data auditing component and the ACL are co-located remote from the user.

7. The system of claim 1, further comprising an access log that maintains access request data as a function of the ACL.

8. The system of claim 7, the access log maintains successful and unsuccessful attempts to access data as a function of the ACL.

9. The system of claim 1, further comprising an ACL generator component that automatically maintains the ACL as a function of at least one of content of the data and a preference of the owner of the data.

10. The system of claim 1, the data auditing component selectively renders the data based at least in part upon a context of the user.

11. The system of claim 10, further comprising an identity analysis component that further establishes the identity of the user, the ACL limits access to the data based at least in part upon the established identity.

12. The system of claim 11, the identity analysis component employs the sensor component that facilitates establishment of the identity of the user.

13. The system of claim 1, wherein the sensor component is configured to gather information further comprising
    biometric information associated with the user.

14. The system of claim 10, further comprising a monitoring component that tracks at least one of use and access attempts of the data.

15. A computer-implemented method of managing data, the computer-implemented method comprising:
    analyzing data items to determine at least one of a content, a type or a purpose of the data items;
    receiving a request for access to a data item from a requestor;
    employing machine learning and machine reasoning using a data log the includes user identities and information relating to access patterns pertaining to user access of data to establish a policy related to the data;
    automatically creating an access control list (ACL) based at least on the analyzing and the employing machine learning and machine reasoning;
    establishing an identity of the requestor, wherein the establishing includes sensing aspects of the requestor, the aspects including;
        a role of the requestor;
        a location of the requestor; and
        an organizational affiliation of the requestor;
    searching the ACL for the data item; and
    granting or denying access to the data item based upon the identity in view of the ACL.

16. The computer-implemented method of claim 15, the automatically creating the access control list being further based at least in accordance with an owner policy.

17. The computer-implemented method of claim 15, further comprising:
    tracking access attempts and access denials of the data item; and
    reporting the access attempts and the access denials to an owner of the data item.

18. A computer-readable storage device comprising instructions stored thereon that, when executed by a processor, perform acts that facilitate managing access to a plurality of data items, the acts including:
    determining an access preference of an owner of a plurality of data items;
    generating an access control list (ACL) that controls access to a subset of the data items as a function of the access preference;
    monitoring access attempts and denials of the subset of data items;
    notifying the owner of unauthorized attempts to access at least one of the subset of data items;
    notifying the owner of an identity of a client or user that accesses or attempts access to at least one of the subset of data items;

determining access patterns and denial patterns based on the monitoring;

logging the access patterns and the denial patterns in a log;

employing artificial intelligence (AI) and/or machine learning and reasoning (MLR) on the log and the subset of data items to infer at least one additional access preference of the owner; and updating the ACL based at least in part upon the at least one additional access preference.

19. The computer-readable storage device of claim 18, the acts further comprising:

determining, based on an analysis of the log and the subset of data items by the owner, another additional access preference; and updating the ACL based at least in part upon the another additional access preference.

\* \* \* \* \*